US012754904B2

(12) United States Patent
Cai et al.

(10) Patent No.: US 12,754,904 B2
(45) Date of Patent: Oct. 6, 2026

(54) METHOD AND APPARATUS FOR PROCESSING LOG REQUEST, DEVICE, AND STORAGE MEDIUM

(71) Applicant: Beijing Volcano Engine Technology Co., Ltd., Beijing (CN)

(72) Inventors: Shu Cai, Beijing (CN); Yi Liu, Beijing (CN); Shuliang Ren, Beijing (CN); Minghui Ma, Beijing (CN); Jianxiong Chang, Beijing (CN); Wenlong Ren, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/903,657

(22) Filed: Oct. 1, 2024

(65) Prior Publication Data

US 2025/0209070 A1 Jun. 26, 2025

(30) Foreign Application Priority Data

Dec. 20, 2023 (CN) ......................... 202311766870.5

(51) Int. Cl.

*G06F 16/245* (2019.01)
*G06F 7/08* (2006.01)
*G06F 16/22* (2019.01)

(52) U.S. Cl.

CPC .............. *G06F 16/245* (2019.01); *G06F 7/08* (2013.01); *G06F 16/2255* (2019.01)

(58) Field of Classification Search

CPC ....... G06F 16/245; G06F 16/2255; G06F 7/08
See application file for complete search history.

(56) References Cited

U.S. PATENT DOCUMENTS

| | | | | |
|---|---|---|---|---|
| 9,800,455 | B1 * | 10/2017 | Upshur | G06F 11/00 |
| 10,409,511 | B1 | 9/2019 | Subbarao et al. | |
| 11,758,460 | B1 * | 9/2023 | Myron | H04L 47/2475 370/235 |
| 2018/0295640 | A1 * | 10/2018 | Zou | H04L 47/2408 |
| 2024/0414574 | A1 * | 12/2024 | Alworth | H04W 24/10 |

FOREIGN PATENT DOCUMENTS

CN 106992886 A 7/2017

* cited by examiner

*Primary Examiner* — Alicia M Willoughby

(57) ABSTRACT

A method for processing a log request includes: obtaining, for a write request for log information of each service, a service identifier of the service and a traffic type of the service, where the traffic type is used to indicate a write traffic range of the log information of the service within a preset duration; determining, based on the service identifier and the traffic type of the service, at least one target log server that processes the write request, and determining, based on the service identifier and the traffic type of the service, storage path information of the log information of the service on a log storage unit; and writing, through the at least one target log server, the log information of the service into the log storage unit based on the storage path information.

20 Claims, 4 Drawing Sheets

METHOD AND APPARATUS FOR PROCESSING LOG REQUEST, DEVICE, AND STORAGE MEDIUM

CROSS-REFERENCES TO RELATED APPLICATIONS

This application claims priority to Chinese patent application No. 202311766870.5, filed on Dec. 20, 2023 and entitled "METHOD AND APPARATUS FOR PROCESSING LOG REQUEST, DEVICE, AND STORAGE MEDIUM". The content of the above application is hereby incorporated by reference in its entirety.

TECHNICAL FIELD

Embodiments of the present disclosure relate to the field of cloud service technologies, and in particular, to a method and apparatus for processing a log request, a device, and a storage medium.

BACKGROUND

With the development of cloud service technologies, a plurality of microservices may be deployed on a cloud service system, and various types of network businesses are processed through the microservices. When a corresponding business is processed through a microservice, log information corresponding to the microservice may be generated, and a problem existing in the cloud service system may be queried through the log information.

In the related art, the log information corresponding to the microservice may be stored by a log storage system. When the cloud service system processes the corresponding business through the microservice, the cloud service system generates the log information corresponding to the microservice, and sends a write request for the log information to the log storage system. The log storage system stores the log information corresponding to the microservice, and establishes a corresponding index relationship, so that querying of the log information corresponding to the microservice is facilitated.

However, the inventors have found that the prior art has at least the following technical problems: when there are a large quantity of microservices, the quantity of log information generated by the microservices is also large, resulting in low efficiency of the log storage system in storing the log information.

SUMMARY

Embodiments of the present disclosure provide a method and apparatus for processing a log request, a device, and a storage medium, which can improve efficiency of a log storage system in storing log information.

In a first aspect, an embodiment of the present disclosure provides a method for processing a log request, applied to a log storage system, where the log storage system includes a request processing unit and a log storage unit, where the request processing unit includes a plurality of log servers; and the method includes:

- obtaining, for a write request for log information of each service, a service identifier of the service and a traffic type of the service, where the traffic type is used to indicate a write traffic range of the log information of the service within a preset duration;
- determining, based on the service identifier and the traffic type of the service, at least one target log server that processes the write request, and determining, based on the service identifier and the traffic type of the service, storage path information of the log information of the service on the log storage unit; and
- writing, through the at least one target log server, the log information of the service into the log storage unit based on the storage path information.

In a second aspect, an embodiment of the present disclosure provides an apparatus for processing a log request, applied to a log storage system, where the log storage system includes a request processing unit and a log storage unit, where the request processing unit includes a plurality of log servers; and the apparatus includes:

- an obtaining module, configured to obtain, for a write request for log information of each service, a service identifier of the service and a traffic type of the service, where the traffic type is used to indicate a write traffic range of the log information of the service within a preset duration;
- a determining module, configured to determine, based on the service identifier and the traffic type of the service, at least one target log server that processes the write request, and determine, based on the service identifier and the traffic type of the service, storage path information of the log information of the service on the log storage unit; and
- a processing module, configured to write, through the at least one target log server, the log information of the service into the log storage unit based on the storage path information.

In a third aspect, an embodiment of the present disclosure provides an electronic device, including:

- a processor, and a memory communicatively connected to the processor;
- where the memory stores computer-execution instructions; and
- the processor executes the computer-execution instructions stored in the memory to implement the method for processing a log request according to the first aspect.

In a fourth aspect, an embodiment of the present disclosure provides a computer-readable storage medium, where the computer-readable storage medium stores computer-execution instructions, and when a processor executes the computer-execution instructions, the method for processing a log request according to the first aspect is implemented.

In a fifth aspect, an embodiment of the present disclosure provides a computer program product, including a computer program, and when the computer program is executed by a processor, the method for processing a log request according to the first aspect is implemented.

The method and apparatus for processing a log request, the device, and the storage medium are provided in the embodiments of the present disclosure. The method includes: obtaining, for the write request for the log information of each service, the service identifier of the service and the traffic type of the service, where the traffic type is used to indicate the write traffic range of the log information of the service within the preset duration; determining, based on the service identifier and the traffic type of the service, at least one target log server that processes the write request, and determining, based on the service identifier and the traffic type of the service, the storage path information of the log information of the service on the log storage unit; and writing, through the at least one target log server, the log information of the service into the log storage unit based on the storage path information. In the embodiments of the present application, when a write request for log information of a certain service is received, a log server that processes the write request and storage path information of the log information are determined based on the traffic size of the service. In this way, log information of different services can be stored in different locations through different log servers, that is, an architecture with computing and storage separated is adopted, and larger-scale log writing and storage are supported, so that writing and querying of the log information are facilitated. Therefore, efficiency of storing the log information is improved, and management of high-traffic log information is realized.

BRIEF DESCRIPTION OF THE DRAWINGS

In order to more clearly describe the technical solutions in the embodiments of the present disclosure or in the prior art, the following briefly introduces the accompanying drawings required for describing the embodiments or the prior art. Apparently, the accompanying drawings in the following description show some embodiments of the present disclosure, and a person of ordinary skill in the art may still derive other drawings from these accompanying drawings without creative efforts.

DESCRIPTION OF EMBODIMENTS

Figure 1:
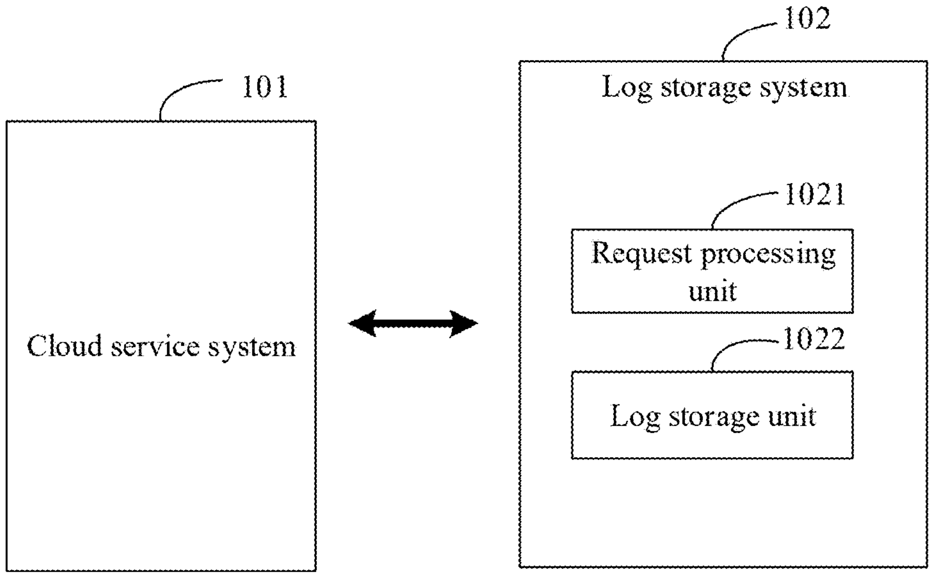
FIG. 1 is a schematic diagram of an application scenario of a method for processing a log request according to an embodiment of the present disclosure.

In order to make the objectives, technical solutions, and advantages of the embodiments of the present disclosure clearer, the following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

It should be noted that user information (including but not limited to user equipment information and user personal information) and data (including but not limited to data for analysis, stored data, and displayed data) involved in the present application are information and data authorized by users or fully authorized by all parties. The collection, use, and processing of related data need to comply with relevant laws, regulations, and standards, and corresponding operation entries are provided for users to choose to authorize or refuse.

With the development of cloud service technologies, a plurality of microservices may be deployed on a cloud service system, and various types of network businesses are processed through the microservices. When a corresponding business is processed through a microservice, log information corresponding to the microservice may be generated, and a problem existing in the cloud service system may be queried through the log information.

In the related art, the log information corresponding to the microservice may be stored by a log storage system. When the cloud service system processes the corresponding business through the microservice, the cloud service system generates the log information corresponding to the microservice, and sends a write request for the log information to the log storage system. The log storage system stores the log information corresponding to the microservice, and establishes a corresponding index relationship, so that querying of the log information corresponding to the microservice is facilitated. However, when there are a large quantity of microservices, the quantity of log information generated by the microservices is also large, resulting in low efficiency of the log storage system in storing the log information.

It can be seen that how to improve the efficiency of the log storage system in storing the log information is a technical problem to be solved urgently at present.

To solve the above problems, the following technical concept is provided in the embodiments: from a dimension of log information of each service, a log server that processes the service and storage path information of log information are determined based on the traffic size of the service. In this way, high-traffic services and low-traffic services are processed through different log servers, so that efficiency of writing and querying of the log information can be improved.

Accordingly, specific steps may include: first, obtaining, for a write request for log information of each service, a service identifier of the service and a traffic type of the service, where the traffic type is used to indicate a write traffic range of the log information of the service within a preset duration; then, determining, based on the service identifier and the traffic type of the service, at least one target log server that processes the write request, and determining, based on the service identifier and the traffic type of the service, storage path information of the log information of the service on the log storage unit; and finally, writing, through the at least one target log server, the log information of the service into the log storage unit based on the storage path information.

In this case, when a write request for log information of a certain service is received, a log server that processes the write request and storage path information of the log information are determined based on the traffic size of the service. In this way, log information of different services can be stored in different locations through different log servers, that is, an architecture with computing and storage separated is adopted, and larger-scale log writing and storage are supported, so that writing and querying of the log information are facilitated. Therefore, efficiency of storing the log information is improved, and management of high-traffic log information is realized.

An application scenario of the embodiments of the present disclosure is described below.

The method for processing a log request provided in the embodiments of the present disclosure may be applied to a scenario in which a write request for log information of any microservice is processed. FIG. 1 is a schematic diagram of an application scenario of a method for processing a log request according to an embodiment of the present disclosure. As shown in FIG. 1, a cloud service system 101 may be connected to a log storage system 102 by wire or wirelessly. When the cloud service system 101 (equivalent to a client) processes a corresponding business through a microservice, the cloud service system 101 generates log information corresponding to the microservice, and sends a write request for the log information to the log storage system 102. The log storage system 102 includes a request processing unit 1021 and a log storage unit 1022. The log storage system 102 receives the write request for the log information corresponding to the microservice, and the request processing unit 1021 writes the log information into the log storage unit 1022 by using the method for processing a log request provided in the embodiments of the present disclosure. Detailed embodiments are used below to describe the method for processing a log request provided in the embodiments of the present disclosure in detail.

Figure 2:
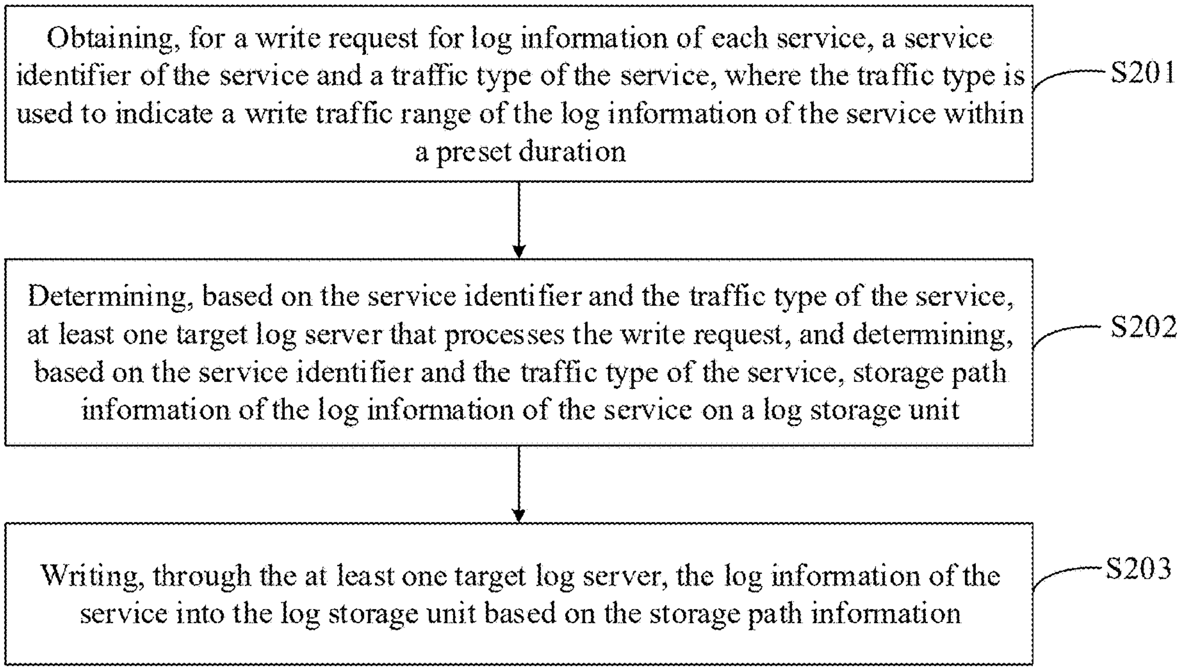
FIG. 2 is a flowchart of a method for processing a log request according to an embodiment of the present disclosure.

FIG. 2 is a flowchart of a method for processing a log request according to an embodiment of the present disclosure. An execution subject of the method may be a terminal device, or may be a server device. In the embodiments of the present application, a log storage system is taken as an example of the execution subject for illustration. The log storage system includes a request processing unit and a log storage unit. As shown in FIG. 2, the method includes the following steps.

S201: obtaining, for a write request for log information of each service, a service identifier of the service and a traffic type of the service, where the traffic type is used to indicate a write traffic range of the log information of the service within a preset duration.

In the embodiments of the present disclosure, the service may be an application or a microservice installed on a terminal. During running, the service generates the corresponding log information, and sends the write request for the log information to the log storage system. The write request may be sent when the log information is generated, or may be sent periodically.

The write request carries the service identifier of the service. The service identifier is used to distinguish different services. In an implementation, the service identifier is a service name.

In an implementation, the log storage system stores a correspondence between service identifiers and traffic types of services. Correspondingly, the log storage system may determine, through the obtained service identifier, the traffic type of the service corresponding to this service identifier from the stored correspondence between the service identifiers and the traffic types of services.

The traffic type of the service may be determined through a traffic range in which write traffic of the log information of the service within the preset duration is located. For example, the traffic type of the service may be determined through a traffic range in which write traffic of the log information of the service yesterday (for 24 hours) is located.

In an implementation, the traffic type includes a first traffic type, a second traffic type, and a third traffic type, where write traffic of log information within the preset duration corresponding to a service of the first traffic type is located in a first traffic range, write traffic of log information within the preset duration corresponding to a service of the second traffic type is located in a second traffic range, and write traffic of log information within the preset duration corresponding to a service of the third traffic type is located in a third traffic range. The first traffic range is greater than the second traffic range, and the second traffic range is greater than the third traffic range. For example, the first traffic type, the second traffic type, and the third traffic type are a high-traffic type, a medium-traffic type, and a low-traffic type in sequence.

The embodiments of the present disclosure does not specifically limit values of the first traffic range, the second traffic range, and the third traffic range. In an implementation, the write traffic of the log information within the preset duration may be an average write traffic within the preset duration. For example, the first traffic range in which the average write traffic of the service of the high-traffic type is located is greater than or equal to 1 G/s. The second traffic range in which the average write traffic of the service of the medium-traffic type is located is greater than 30 M/s and less than 1 G/s. The third traffic range in which the average write traffic of the service of the low-traffic type is located is less than 30 M/s.

In the embodiments of the present disclosure, a value of the preset duration is not specifically limited. In an implementation, the preset duration is 1 hour, 12 hours, 24 hours, or the like. It should be noted that in different time periods, a traffic type of a same service may be different.

S202: determining, based on the service identifier and the traffic type of the service, at least one target log server that processes the write request, and determining, based on the service identifier and the traffic type of the service, storage path information of the log information of the service on the log storage unit.

In the embodiments of the present disclosure, the request processing unit includes a plurality of log servers, and the plurality of log servers correspond to a plurality of log server identifiers sorted by size. The log server identifiers are used to distinguish different log servers. In an implementation, a log server identifier may be a number corresponding to a server. For example, the plurality of log servers are 100 log servers. The plurality of log server identifiers sorted by size are log server 1, log server 2, log server 3, . . . , and log server 100 in sequence.

In an implementation, the determining, based on the service identifier and the traffic type of the service, at least one target log server that processes the write request may include the following steps (a1) to (a3).

(a1) Performing hash modulo processing on the service identifier based on a quantity of a plurality of log server identifiers, to determine an obtained remainder as a first hash parameter corresponding to the service identifier, and selecting a first target server identifier corresponding to the first hash parameter from the plurality of log server identifiers.

In this step, the hash modulo processing is performed on the service identifier based on the quantity of the plurality of log server identifiers sorted by size. That is, hash operation (for example, consistency hash operation) is first performed on the service identifier, to obtain a hash value corresponding to the service identifier; then modulo is performed on the hash value based on the quantity of the plurality of log server identifiers, and the obtained remainder is used as the first hash parameter corresponding to the service identifier. The first hash parameter (namely, the obtained remainder) is the same as a sequence number of the first target server identifier in the plurality of log server identifiers sorted by size. For example, the first hash parameter is 3, and thus the first target server identifier is the third log server identifier in the plurality of log server identifiers, namely, the log server 3.

(a2) Determining, based on the traffic type of the service and the first target server identifier, sort position information of at least one target log server that processes the write request.

In the embodiments of the present disclosure, the service of the high-traffic type has a relatively high average write traffic, and a corresponding quantity of log servers is relatively large; the service of the low-traffic type has a relatively low average write traffic, and a corresponding quantity of log servers is relatively small.

In an implementation, the sort position information is a sort range, in the plurality of log server identifiers sorted by size, of at least one target server identifier corresponding to the at least one target log server.

Accordingly, this step may include: determining a start sequence number of the sort range based on the first target server identifier, and determining an end sequence number of the sort range based on the traffic type of the service, where a quantity of sequence numbers within the sort range is the same as a quantity of target log servers that process the service.

In an implementation, a correspondence between traffic types of services and quantities of log servers that process the services may be stored in advance, so that based on the traffic type of the service, the quantity of the target log servers that process the service can be determined from the stored correspondence between the traffic types of services and the quantities of log servers.

For example, the traffic type of the service includes the high-traffic type, the medium-traffic type, and the low-traffic type. The correspondence between the traffic types of services and the quantities of log servers is as follows: a quantity of log servers corresponding to the high-traffic type is 20, a quantity of log servers corresponding to the medium-traffic type is 10, and a quantity of log servers corresponding to the low-traffic type is 3. Assuming that the traffic type of the service is the high-traffic type, the quantity of the target log servers corresponding to the traffic type of the service is determined from the stored correspondence between the traffic types of services and the quantities of log servers as 20. In this case, if the plurality of log server identifiers sorted by size are the log server 1, the log server 2, the log server 3, . . . , and the log server 100 in sequence, and the first target server identifier is log server 11 (the start sequence number is 11), the end sequence number of the sort range is determined based on the traffic type of the service as 30 (corresponding to log server 30). In this case, the quantity (20) of sequence numbers within the sort range (11-30) is the same as the quantity (20) of the target log servers that process the service.

(a3) Selecting the at least one target log server that processes the write request from the plurality of log servers based on the sort position information.

For example, the sort position information is the start sequence number of 11 and the end sequence number of 30. Correspondingly, the at least one target log server that is selected from the plurality of log servers and processes the write request is the log server 11, log server 12, . . . , and the log server 30 in sequence.

Here, since for each service, the at least one target log server corresponding to the traffic type of the service is selected from the plurality of log servers, efficiency of writing the log information is improved.

In the embodiments of the present disclosure, the log storage unit includes a plurality of storage directories, and each storage directory includes a plurality of storage partitions sorted by size. It should be noted that the storage directory and the storage partition are logical levels, and do not represent specific physical storage space. For example, the storage directory may be a table name.

In an implementation, the determining, based on the service identifier and the traffic type of the service, the storage path information of the log information of the service on the log storage unit may include the following steps (b1) to (b3).

(b1) Selecting a target storage directory corresponding to the traffic type of the service from a plurality of storage directories, and determining a quantity of a plurality of storage partitions that the target storage directory includes and are sorted by size.

For example, the target storage directory may be storage table 1. The storage table 1 may include 20 storage partitions sorted by size, and the 20 storage partitions are storage partition 1, storage partition 2, storage partition 3, . . . , and storage partition 20 in sequence.

(b2) Performing hash modulo processing on the service identifier based on the quantity of the plurality of storage partitions that the target storage directory includes and are sorted by size, to determine an obtained remainder as a second hash parameter corresponding to the service identifier, and selecting a target storage partition corresponding to the second hash parameter from the plurality of storage partitions that the target storage directory includes and are sorted by size.

In this step, the hash modulo processing is performed on the service identifier based on the quantity of the plurality of storage partitions sorted by size. That is, hash operation (for example, consistency hash operation) is first performed on the service identifier, to obtain a hash value corresponding to the service identifier; then modulo is performed on the hash value based on the quantity of the plurality of storage partitions, and the obtained remainder is used as the second hash parameter corresponding to the service identifier. The second hash parameter (namely, the obtained remainder) is the same as a sequence number of the target storage partition in the plurality of storage partitions sorted by size. For example, the second hash parameter is 5, and thus the target storage partition is the fifth storage partition in the plurality of storage partitions, namely, storage partition 5.

(b3) Determining the target storage partition within the target storage directory as the storage path information of the log information of the service on the log storage unit.

For example, the storage partition 5 in the storage table 1 is determined as the storage path information of the log information of the service on the log storage unit.

Here, since for each service, the storage path information (for example, a storage node) corresponding to the traffic type of the service is selected from the plurality of storage directories within the log storage unit, writing affinity binding between the service and the storage node is realized, and locality of service logs is effectively improved, so that it is convenient to quickly query log information corresponding to a certain service.

S203: writing, through the at least one target log server, the log information of the service into the log storage unit based on the storage path information.

In an implementation, when there is a large quantity of log information of the service, the log information may be distributed to each target log server by quantity, to ensure load balancing of a plurality of target log servers; or a plurality of pieces of log information may be distributed to each target log server based on a type of the log information.

In the method for processing a log request provided in the embodiments, for the write request for the log information of each service, the service identifier of the service and the traffic type of the service are obtained, where the traffic type is used to indicate the write traffic range of the log information of the service within the preset duration; at least one target log server that processes the write request is determined based on the service identifier and the traffic type of the service, and the storage path information of the log information of the service on the log storage unit is determined based on the service identifier and the traffic type of the service; and the log information of the service is written into the log storage unit based on the storage path information through the at least one target log server. In the embodiments of the present application, when a write request for log information of a certain service is received, a log server that processes the write request and storage path information of the log information are determined based on the traffic size of the service. In this way, log information of different services can be stored in different locations through different log servers, that is, an architecture with computing and storage separated is adopted, and larger-scale log writing and storage are supported, so that writing and querying of the log information are facilitated. Therefore, efficiency of storing the log information is improved, and management of high-traffic log information is realized.

Figure 3:
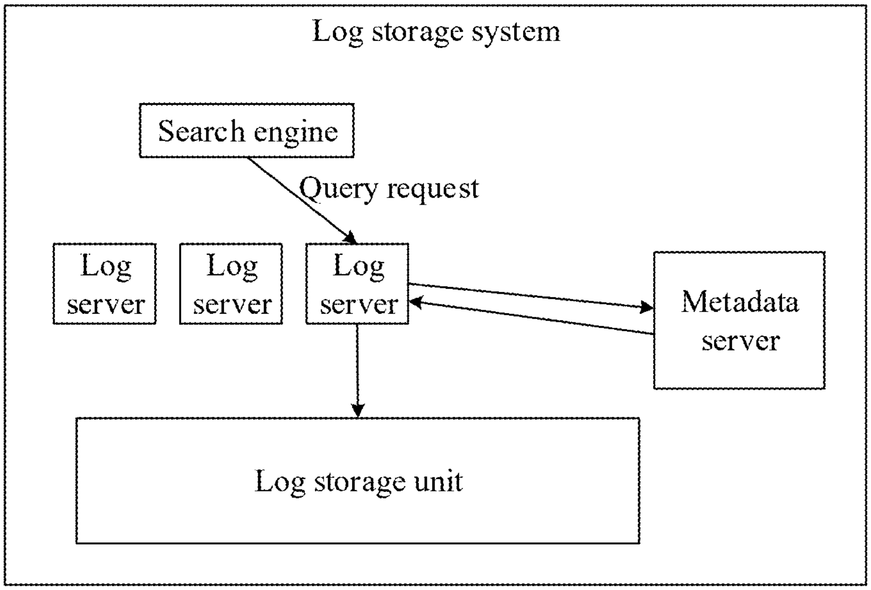
FIG. 3 is a schematic structural diagram of a log storage system according to an embodiment of the present disclosure.

It should be noted that within different time periods, a traffic type of a same service may be different, and accordingly, storage path information may also be different. As shown in FIG. 3, the log storage system further includes a metadata server. A correspondence between service identifiers, storage path information, and storage time periods may be stored through the metadata server. Correspondingly, specific steps may include the following.

S301: for each service, obtaining a plurality of storage time periods corresponding to log information of the service and storage path information corresponding to each storage time period.

S302: establishing a correspondence between a service identifier, the storage path information, and the storage time periods, and store the correspondence between the service identifier, the storage path information, and the storage time periods in the metadata server.

Figure 4:
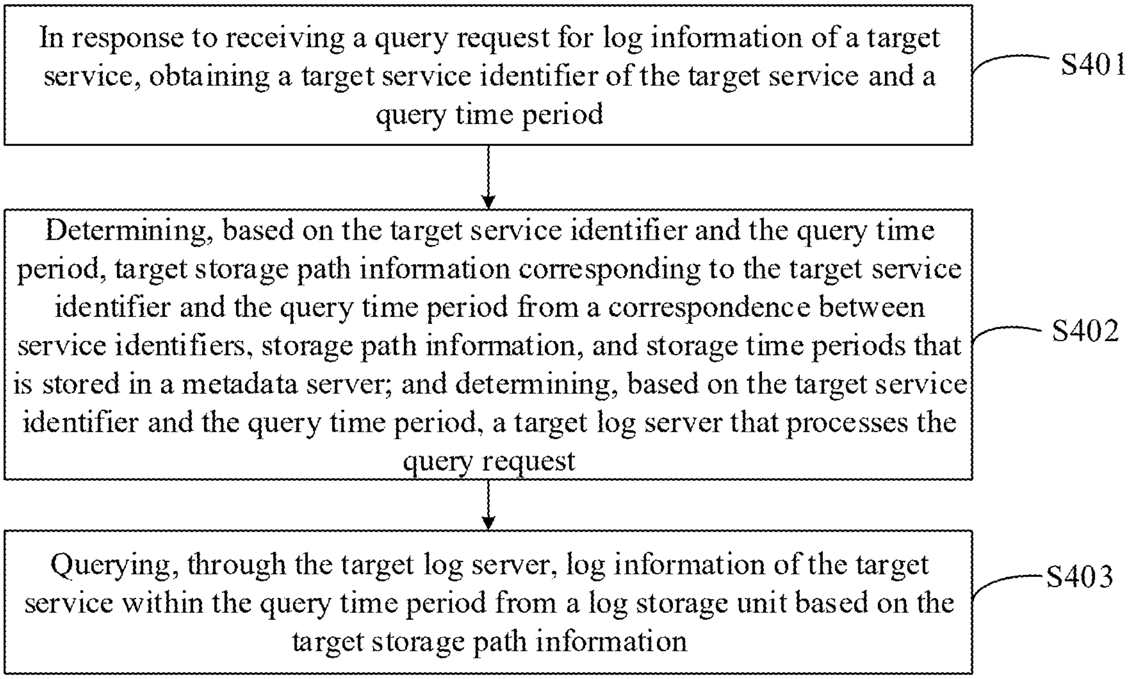
FIG. 4 is a flowchart of a method for processing a log query request according to an embodiment of the present disclosure.

In the embodiments of the present disclosure, the log information of the service may be queried in a plurality of manners. For example, retrieval modes such as inverted indexing, full-text word segmentation indexing, and pattern matching may be customized. In some embodiments, a query request may include a target service identifier and a query time period. Correspondingly, as shown in FIG. 4, query steps include the following.

S401: in response to receiving a query request for log information of a target service, obtaining a target service identifier of the target service and a query time period.

In some embodiments, the log information of the service may be queried through the service identifier and the query time period. Correspondingly, this step is: in response to receiving the query request for the log information of the target service, obtaining the target service identifier of the target service and the query time period from the query request.

In some other embodiments, a plurality of services are used to process one business request, and log information of the plurality of services related to a business identifier may be queried through the business identifier. Correspondingly, in response to receiving the query request for the log information of the target service, obtaining the target service identifier of the target service and the query time period includes: in response to receiving a query request for a target business identifier, obtaining at least one target service corresponding to the target business identifier; and for each target service, determining that a query request for log information of the target service is received, and obtaining a target service identifier of the target service and a query time period.

In an implementation, when a service receives a business request, a business identifier (for example, logid) may be generated. When a downstream service is called, the logid is transparently transmitted to the downstream service. Here, the logid may be used as a standard field of the log information, to connect upstream and downstream log information of different microservices in series. Logids corresponding to the plurality of services that process the same business request are the same.

S402: determining, based on the target service identifier and the query time period, target storage path information corresponding to the target service identifier and the query time period from a correspondence between service identifiers, storage path information, and storage time periods that is stored in the metadata server; and determining, based on the target service identifier and the query time period, a target log server that processes the query request.

In an implementation, the plurality of log servers correspond to a plurality of log server identifiers sorted by size; and correspondingly, the determining, based on the target service identifier and the query time period, the target log server that processes the query request may include: determining, from the correspondence between the service identifier, the storage path information, and the storage time periods of each service, a plurality of storage time periods that correspond to the target service identifier and are sorted by sequence; determining a sequence number of the query time period in the plurality of storage time periods sorted by sequence; performing hash modulo processing on the sequence number corresponding to the query time period based on a quantity of the plurality of log server identifiers, to determine an obtained remainder as a third hash parameter corresponding to the sequence number, and selecting a second target server identifier corresponding to the third hash parameter from the plurality of log server identifiers; and determining a log server corresponding to the second target server identifier as the target log server that processes the query request.

The hash modulo processing is performed on the sequence number corresponding to the query time period based on the quantity of the plurality of log server identifiers. That is, hash operation (for example, consistency hash operation) is first performed on the sequence number corresponding to the query time period, to obtain a hash value corresponding to the sequence number; then modulo is performed on the hash value based on the quantity of the plurality of log server identifiers, and the obtained remainder is used as the third hash parameter corresponding to the sequence number. The third hash parameter (namely, the obtained remainder) is the same as a sequence number of the second target server identifier in the plurality of log server identifiers sorted by size. For example, the third hash parameter is 5, and thus the second target server identifier is the fifth log server identifier in the plurality of log server identifiers, namely, log server 5.

S403: querying, through the target log server, log information of the target service within the query time period from the log storage unit based on the target storage path information.

In the embodiments of the present disclosure, since log information of different services can be stored in different locations through different log servers, when querying log information of a certain service, the querying is performed from a corresponding storage location instead of querying in the entire log storage unit. Therefore, a search range is reduced, and efficiency of querying the log information is improved.

In some other embodiments, the log information of the target service within the query time period includes at least one log packet and a packet identifier corresponding to each log packet, and when referring to log information of a certain service, a user usually hopes to view a complete log stream of the service on a platform. To this end, a capability of context retrieval is realized: assigning a unique id (also the packet identifier) to each log packet, and assigning id ±1 to a previous packet and a next packet of the log packet. The log stream may be viewed in sequence or in reverse sequence on the platform through an auto-increase/auto-decrease operation on the id.

Figure 5:
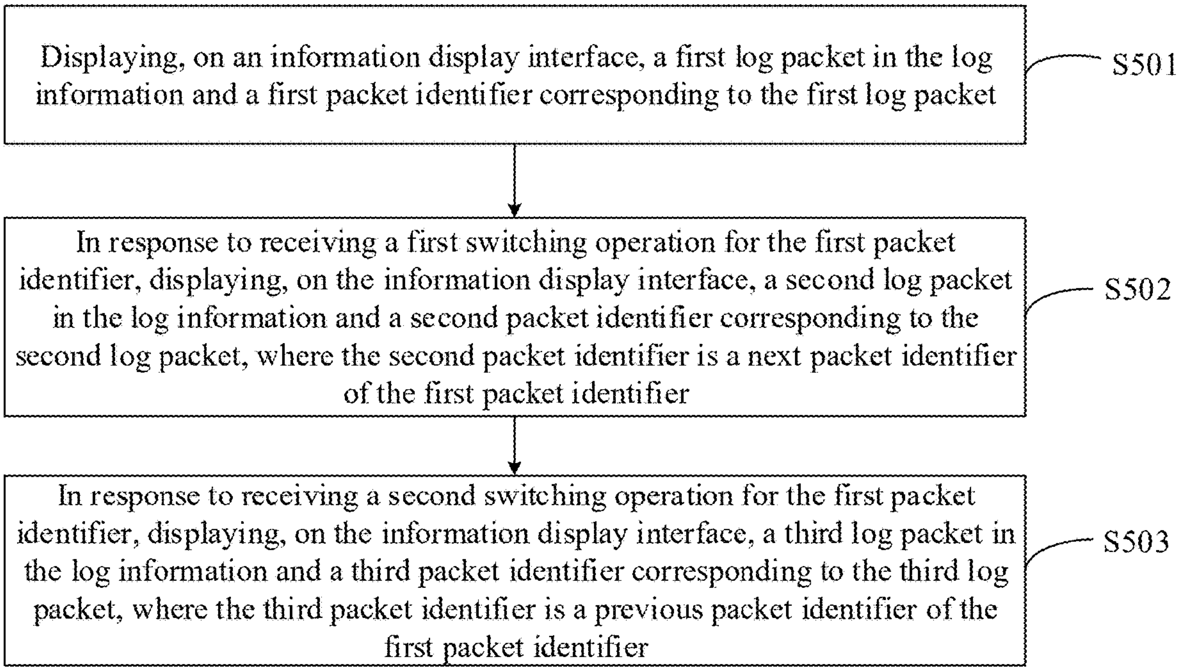
FIG. 5 is a flowchart of another method for processing a log query request according to an embodiment of the present disclosure.

In an implementation, the query request may be a packet identifier corresponding to a log packet. As shown in FIG. 5, after querying, through the target log server, the log information of the target service within the query time period from the log storage unit based on the target storage path information, the method further includes the following steps.

S501: displaying, on an information display interface, a first log packet in the log information and a first packet identifier corresponding to the first log packet.

For example, log information corresponding to service A includes 20 log packets. A first log packet (for example, the tenth log packet) in the log information and a first packet identifier (for example, log packet 10) corresponding to the first log packet are displayed on the information display interface.

S502: in response to receiving a first switching operation for the first packet identifier, displaying, on the information display interface, a second log packet in the log information and a second packet identifier corresponding to the second log packet, where the second packet identifier is a next packet identifier of the first packet identifier.

In an implementation, the first switching operation may be a trigger operation on an "increase button". For example, the "increase button" is "+", and is located on a right side of the first packet identifier.

S503: in response to receiving a second switching operation for the first packet identifier, displaying, on the information display interface, a third log packet in the log information and a third packet identifier corresponding to the third log packet, where the third packet identifier is a previous packet identifier of the first packet identifier.

In an implementation, the second switching operation may be a trigger operation on a "decrease button". For example, the "decrease button" is "–", and is located on a left side of the first packet identifier.

In the embodiments of the present application, the log information of the target service is displayed by means of a log packet, so that the user can obtain required log information from the context of the log packet.

It should be noted that the log information further includes a log type, where the log type may include an error log type. In the method, the log information of the error log type may further be separately shunted and stored, to facilitate the user to directly query abnormal log information and facilitate aggregation on indicators of the abnormal log information. In an implementation, the user may query the corresponding abnormal log information through a regular expression.

Figure 6:
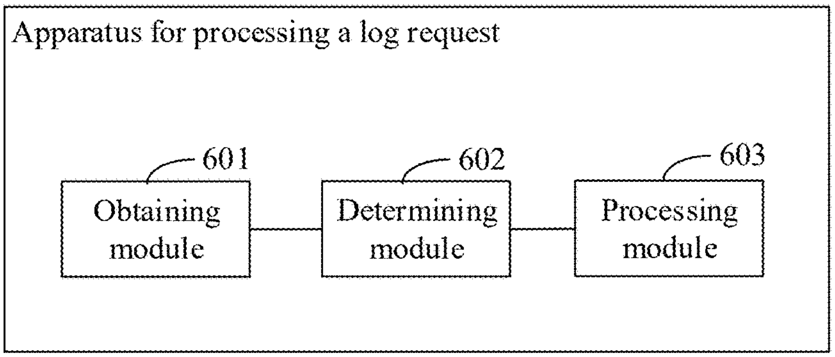
FIG. 6 is a structural block diagram of an apparatus for processing a log request according to an embodiment of the present disclosure.

FIG. 6 is a structural block diagram of an apparatus for processing a log request according to an embodiment of the present disclosure. The apparatus for processing a log request is applied to a log storage system, where the log storage system includes a request processing unit and a log storage unit, and the request processing unit includes a plurality of log servers. The apparatus includes: an obtaining module 601, a determining module 602, and a processing module 603.

The obtaining module 601 is configured to obtain, for a write request for log information of each service, a service identifier of the service and a traffic type of the service, where the traffic type is used to indicate a write traffic range of the log information of the service within a preset duration.

The determining module 602 is configured to determine, based on the service identifier and the traffic type of the service, at least one target log server that processes the write request, and determine, based on the service identifier and the traffic type of the service, storage path information of the log information of the service on the log storage unit.

The processing module 603 is configured to write, through the at least one target log server, the log information of the service into the log storage unit based on the storage path information.

According to one or more embodiments of the present disclosure, the plurality of log servers correspond to a plurality of log server identifiers sorted by size; and correspondingly, when determining, based on the service identifier and the traffic type of the service, at least one target log server that processes the write request, the determining module 602 is specifically configured to: perform hash modulo processing on the service identifier based on a quantity of the plurality of log server identifiers, to determine an obtained remainder as a first hash parameter corresponding to the service identifier, and select a first target server identifier corresponding to the first hash parameter from the plurality of log server identifiers; determine, based on the traffic type of the service and the first target server identifier, sort position information of the at least one target log server that processes the write request; and select the at least one target log server that processes the write request from the plurality of log servers based on the sort position information.

According to one or more embodiments of the present disclosure, the log storage unit includes a plurality of storage directories, and each storage directory includes a plurality of storage partitions sorted by size; and correspondingly, when determining, based on the service identifier and the traffic type of the service, the storage path information of the log information of the service on the log storage unit, the determining module 602 is specifically configured to: select a target storage directory corresponding to the traffic type of the service from the plurality of storage directories, and determine a quantity of the plurality of storage partitions that the target storage directory includes and are sorted by size; perform hash modulo processing on the service identifier based on the quantity of the plurality of storage partitions that the target storage directory includes and are sorted by size, to determine an obtained remainder as a second hash parameter corresponding to the service identifier, and select a target storage partition corresponding to the second hash parameter from the plurality of storage partitions that the target storage directory includes and are sorted by size; and determine the target storage partition within the target storage directory as the storage path information of the log information of the service on the log storage unit.

According to one or more embodiments of the present disclosure, the log storage system further includes a metadata server; and the apparatus further includes: a storage module; wherein the storage module is configured to: for each service, obtain a plurality of storage time periods corresponding to log information of the service and storage path information corresponding to each storage time period; and establish a correspondence between a service identifier, the storage path information, and the storage time periods, and store the correspondence between the service identifier, the storage path information, and the storage time periods in the According to one or more embodiments of the present disclosure, the apparatus further includes: a query module; wherein the query module is configured to: in response to receiving a query request for log information of a target service, obtain a target service identifier of the target service and a query time period; determine, based on the target service identifier and the query time period, target storage path information corresponding to the target service identifier and the query time period from a correspondence between service identifiers, storage path information, and storage time periods that is stored in the metadata server, and determine, based on the target service identifier and the query time period, a target log server that processes the query request; and query, through the target log server, log information of the target service within the query time period from the log storage unit based on the target storage path information.

According to one or more embodiments of the present disclosure, the plurality of log servers correspond to a plurality of log server identifiers; and when determining, based on the target service identifier and the query time period, the target log server that processes the query request, the query module is specifically configured to: determine, from the correspondence between the service identifier, the storage path information, and the storage time periods of each service, a plurality of storage time periods that correspond to the target service identifier and are sorted by sequence; determine a sequence number of the query time period in the plurality of storage time periods sorted by sequence; perform hash modulo processing on the sequence number corresponding to the query time period based on a quantity of the plurality of log server identifiers, to determine an obtained remainder as a third hash parameter corresponding to the sequence number, and select a second target server identifier corresponding to the third hash parameter from the plurality of log server identifiers; and determine a log server corresponding to the second target server identifier as the target log server that processes the query request.

According to one or more embodiments of the present disclosure, a plurality of services are used to process one business request; and correspondingly, when in response to receiving the query request for the log information of the target service, obtaining the target service identifier of the target service and the query time period, the query module is specifically configured to: in response to receiving a query request for a target business identifier, obtain at least one target service corresponding to the target business identifier; and for each target service, determine that a query request for log information of the target service is received, and obtain a target service identifier of the target service and a query time period.

According to one or more embodiments of the present disclosure, the log information of the target service within the query time period includes at least one log packet and a packet identifier corresponding to each log packet; and correspondingly, the apparatus further includes: a display module, wherein the display module is configured to: display, on an information display interface, a first log packet in the log information and a first packet identifier corresponding to the first log packet; in response to receiving a first switching operation for the first packet identifier, display, on the information display interface, a second log packet in the log information and a second packet identifier corresponding to the second log packet, where the second packet identifier is a next packet identifier of the first packet identifier; and in response to receiving a second switching operation for the first packet identifier, display, on the information display interface, a third log packet in the log information and a third packet identifier corresponding to the third log packet, where the third packet identifier is a previous packet identifier of the first packet identifier.

The obtaining module 601, the determining module 602, and the processing module 603 are connected in sequence. The apparatus for processing a log request provided in the embodiments may execute the technical solutions in the above method embodiments. The implementation principles and technical effects thereof are similar, and are not described here again in the embodiments.

Figure 7:
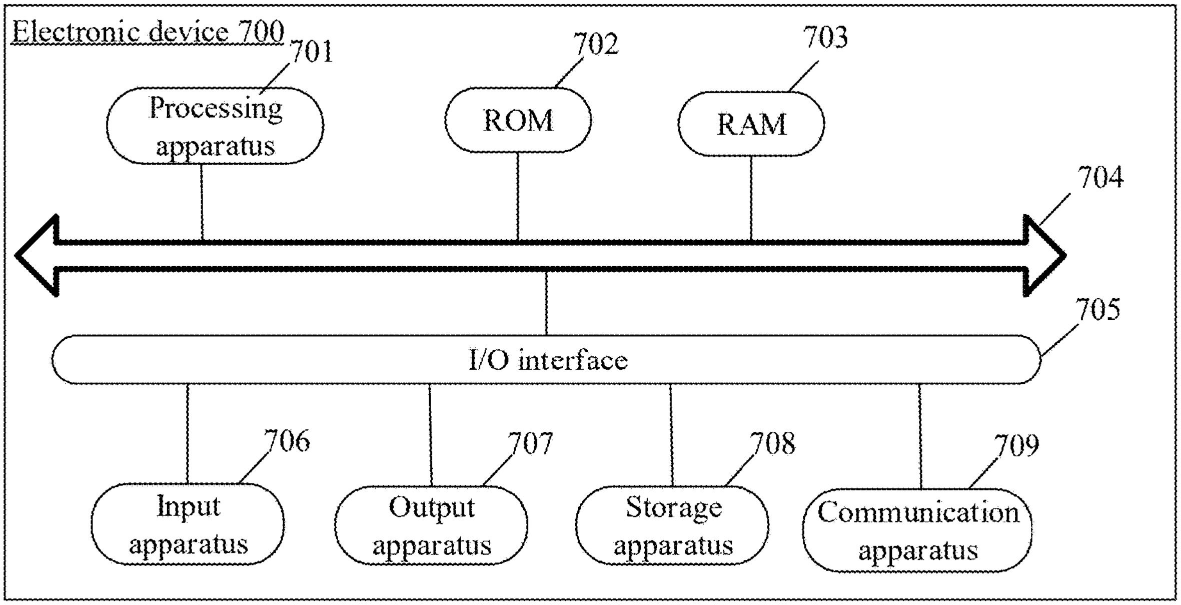
FIG. 7 is a schematic diagram of a hardware structure of an electronic device according to an embodiment of the present disclosure.

FIG. 7 is a schematic diagram of a hardware structure of an electronic device according to an embodiment of the present disclosure. With reference to FIG. 7, an electronic device 700 may be a terminal device or a server. The terminal device may include, but is not limited to, mobile terminals such as a mobile phone, a notebook computer, a digital broadcast receiver, a personal digital assistant (PDA for short), a tablet computer (Portable Android Device, PAD for short), a portable multimedia player (Portable Media Player, PMP for short), a vehicle-mounted terminal (such as a vehicle navigation terminal) and the like, and fixed terminals such as a digital TV, a desktop computer and the like. The electronic device shown in FIG. 7 is merely an example, and shall not impose any limitation on the functions and scope of use of the embodiments of the present disclosure.

As shown in FIG. 7, the electronic device 700 may include a processing apparatus (for example, a central processing unit, a graphics processing unit, etc.) 701 that may perform a variety of appropriate actions and processing in accordance with a program stored in a read only memory (ROM for short) 702 or a program loaded from a storage apparatus 708 into a random access memory (RAM for short) 703. The RAM 703 further stores various programs and data required for the operation of the electronic device 700. The processing apparatus 701, the ROM 702, and the RAM 703 are connected to each other through a bus 704. An input/output (I/O) interface 705 is also connected to the bus 704.

Generally, the following apparatuses may be connected to the I/O interface 705: an input apparatus 706 including, for example, a touch screen, a touchpad, a keyboard, a mouse, a camera, a microphone, an accelerometer, and a gyroscope; an output apparatus 707 including, for example, a liquid crystal display (LCD for short), a speaker, and a vibrator; the storage apparatus 708 including, for example, a tape and a hard disk; and a communication apparatus 709. The communication apparatus 709 may allow the electronic device 700 to perform wireless or wired communication with other devices to exchange data. Although FIG. 7 shows the electronic device 700 having various apparatuses, it should be understood that it is not required to implement or have all of the shown apparatuses. It may be an alternative to implement or have more or fewer apparatuses.

In particular, according to embodiments of the present disclosure, the processes described above with reference to the flowcharts may be implemented as computer software programs. For example, an embodiment of the present disclosure includes a computer program product, which includes a computer program carried on a computer-readable medium, where the computer program includes program code for performing the methods shown in the flowcharts. In such an embodiment, the computer program may be downloaded from a network through the communication apparatus 709 and installed, or installed from the storage apparatus 708, or installed from the ROM 702. When the computer program is executed by the processing apparatus 701, the above-mentioned functions defined in the methods of the embodiments of the present disclosure are performed.

It should be noted that the above computer-readable medium described in the present disclosure may be a computer-readable signal medium, a computer-readable storage medium, or any combination thereof. The computer-readable storage medium may be, for example but not limited to, electric, magnetic, optical, electromagnetic, infrared, or semiconductor systems, apparatuses, or devices, or any combination thereof. More specific examples of the computer-readable storage medium may include, but are not limited to: an electrical connection having one or more wires, a portable computer magnetic disk, a hard disk, a random access memory (RAM), a read only memory (ROM), an erasable programmable read-only memory (EPROM or flash memory), an optical fiber, a portable compact disk read only memory (CD-ROM), an optical storage device, a magnetic storage device, or any suitable combination thereof. In the present disclosure, the computer-readable storage medium may be any tangible medium containing or storing a program that may be used by or in combination with an instruction execution system, apparatus, or device. In the present disclosure, the computer-readable signal medium may include a data signal propagated in a baseband or as a part of a carrier, where the data signal carries computer-readable program code. The propagated data signal may be in various forms, including but not limited to an electromagnetic signal, an optical signal, or any suitable combination thereof. The computer-readable signal medium may also be any computer-readable medium other than the computer-readable storage medium. The computer-readable signal medium can send, propagate, or transmit a program used by or in combination with an instruction execution system, apparatus, or device. The program code contained in the computer-readable medium may be transmitted by any suitable medium, including but not limited to: electric wires, optical cables, radio frequency (RF), or the like, or any suitable combination thereof.

The above computer-readable medium may be contained in the above electronic device. Or, the computer-readable medium may exist independently, without being assembled into the electronic device.

The above computer-readable medium carries one or more programs that, when executed by the electronic device, cause the electronic device to perform the methods shown in the above embodiments.

The computer program code for performing the operations in the present disclosure may be written in one or more programming languages or a combination thereof, where the programming languages include an object-oriented programming language, such as Java, Smalltalk, C++, and further include conventional procedural programming languages, such as "C" language or similar programming languages. The program code may be completely executed on a user computer, partially executed on a user computer, executed as an independent software package, partially executed on a user computer and partially executed on a remote computer, or completely executed on a remote computer or server. In the circumstance involving the remote computer, the remote computer may be connected to the user computer over any type of network, including a local area network (LAN) or a wide area network (WAN), or may be connected to an external computer (for example, connected over the Internet using an Internet service provider).

The flowcharts and block diagrams in the accompanying drawings illustrate the architecture, functions, and operations of the possible implementations of the systems, methods, and computer program products according to various embodiments of the present disclosure. In this regard, each block in the flowcharts or block diagrams may represent a module, program segment, or part of code, and the module, program segment, or part of code contains one or more executable instructions for implementing the specified logical functions. It should also be noted that in some alternative implementations, the functions marked in the blocks may also occur in an order different from that marked in the accompanying drawings. For example, two blocks shown in succession may actually be performed substantially in parallel, or they may sometimes be performed in the reverse order, depending on the functions involved. It should also be noted that each block in the block diagrams and/or the flowcharts, and a combination of the blocks in the block diagrams and/or the flowcharts may be implemented by a dedicated hardware-based system that executes specified functions or operations, or may be implemented by a combination of dedicated hardware and computer instructions.

The units involved in descriptions of the embodiments of the present disclosure may be implemented by software, or may be implemented by hardware. The name of a unit does not constitute a limitation on the unit itself in some cases. For example, the first obtaining unit may also be described as "a unit for obtaining at least two Internet Protocol addresses".

The functions described herein above may be performed at least partially by one or more hardware logic components. For example, without limitation, exemplary types of hardware logic components that may be used include: a field programmable gate array (FPGA), an application-specific integrated circuit (ASIC), an application-specific standard product (ASSP), a system on chip (SOC), a complex programmable logic device (CPLD), and the like.

In the context of the present disclosure, a machine-readable medium may be a tangible medium that may contain or store a program used by or in combination with an instruction execution system, apparatus, or device. The machine-readable medium may be a machine-readable signal medium or a machine-readable storage medium. The machine-readable medium may include but is not limited to electronic, magnetic, optical, electromagnetic, infrared, or semiconductor systems, apparatuses, or devices, or any suitable combination thereof. More specific examples of the machine-readable storage medium may include an electrical connection based on one or more wires, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination thereof.

In a first aspect, according to one or more embodiments of the present disclosure, there is provided a method for processing a log request, applied to a log storage system, where the log storage system includes a request processing unit and a log storage unit, where the request processing unit includes a plurality of log servers; and the method includes:

obtaining, for a write request for log information of each service, a service identifier of the service and a traffic type of the service, where the traffic type is used to indicate a write traffic range of the log information of the service within a preset duration;

determining, based on the service identifier and the traffic type of the service, at least one target log server that processes the write request, and determining, based on the service identifier and the traffic type of the service, storage path information of the log information of the service on the log storage unit; and writing, through the at least one target log server, the log information of the service into the log storage unit based on the storage path information.

According to one or more embodiments of the present disclosure, the plurality of log servers correspond to a plurality of log server identifiers sorted by size; and correspondingly, the determining, based on the service identifier and the traffic type of the service, at least one target log server that processes the write request includes: performing hash modulo processing on the service identifier based on a quantity of the plurality of log server identifiers, to determine an obtained remainder as a first hash parameter corresponding to the service identifier, and selecting a first target server identifier corresponding to the first hash parameter from the plurality of log server identifiers; determining, based on the traffic type of the service and the first target server identifier, sort position information of the at least one target log server that processes the write request; and selecting the at least one target log server that processes the write request from the plurality of log servers based on the sort position information.

According to one or more embodiments of the present disclosure, the log storage unit includes a plurality of storage directories, and each storage directory includes a plurality of storage partitions sorted by size; and correspondingly, the determining, based on the service identifier and the traffic type of the service, the storage path information of the log information of the service on the log storage unit includes: selecting a target storage directory corresponding to the traffic type of the service from the plurality of storage directories, and determining a quantity of a plurality of storage partitions that the target storage directory includes and are sorted by size; performing hash modulo processing on the service identifier based on the quantity of the plurality of storage partitions that the target storage directory includes and are sorted by size, to determine an obtained remainder as a second hash parameter corresponding to the service identifier, and selecting a target storage partition corresponding to the second hash parameter from the plurality of storage partitions that the target storage directory includes and are sorted by size; and determining the target storage partition within the target storage directory as the storage path information of the log information of the service on the log storage unit.

According to one or more embodiments of the present disclosure, the log storage system further includes a metadata server; and the method further includes: for each service, obtaining a plurality of storage time periods corresponding to log information of the service and storage path information corresponding to each storage time period; and establishing a correspondence between a service identifier, the storage path information, and the storage time periods, and storing the correspondence between the service identifier, the storage path information, and the storage time periods in the metadata server.

According to one or more embodiments of the present disclosure, the method further includes: in response to receiving a query request for log information of a target service, obtaining a target service identifier of the target service and a query time period; determining, based on the target service identifier and the query time period, target storage path information corresponding to the target service identifier and the query time period from a correspondence between service identifiers, storage path information, and storage time periods that is stored in the metadata server; and determining, based on the target service identifier and the query time period, a target log server that processes the query request; and querying, through the target log server, log information of the target service within the query time period from the log storage unit based on the target storage path information.

According to one or more embodiments of the present disclosure, the plurality of log servers correspond to a plurality of log server identifiers; and the determining, based on the target service identifier and the query time period, the target log server that processes the query request includes: determining, from the correspondence between the service identifier, the storage path information, and the storage time periods of each service, a plurality of storage time periods that correspond to the target service identifier and are sorted by sequence; determining a sequence number of the query time period in the plurality of storage time periods sorted by sequence; performing hash modulo processing on the sequence number corresponding to the query time period based on a quantity of the plurality of log server identifiers, to determine an obtained remainder as a third hash parameter corresponding to the sequence number, and selecting a second target server identifier corresponding to the third hash parameter from the plurality of log server identifiers; and determining a log server corresponding to the second target server identifier as the target log server that processes the query request.

According to one or more embodiments of the present disclosure, a plurality of services are used to process one service request; and correspondingly, in response to receiving the query request for the log information of the target service, obtaining the target service identifier of the target service and the query time period includes: in response to receiving a query request for a target business identifier, obtaining at least one target service corresponding to the target business identifier; and for each target service, determining that a query request for log information of the target service is received, and obtaining a target service identifier of the target service and a query time period.

According to one or more embodiments of the present disclosure, the log information of the target service within the query time period includes at least one log packet and a packet identifier corresponding to each log packet; and correspondingly, after querying, through the target log server, the log information of the target service within the query time period from the log storage unit based on the target storage path information, the method further includes: displaying, on an information display interface, a first log packet in the log information and a first packet identifier corresponding to the first log packet; in response to receiving a first switching operation for the first packet identifier, displaying, on the information display interface, a second log packet in the log information and a second packet identifier corresponding to the second log packet, where the second packet identifier is a next packet identifier of the first packet identifier; and in response to receiving a second switching operation for the first packet identifier, displaying, on the information display interface, a third log packet in the log information and a third packet identifier corresponding to the third log packet, where the third packet identifier is a previous packet identifier of the first packet identifier.

In a second aspect, according to one or more embodiments of the present disclosure, there is provided an apparatus for processing a log request, applied to a log storage system, where the log storage system includes a request processing unit and a log storage unit, where the request processing unit includes a plurality of log servers; and the apparatus includes:

an obtaining module, configured to obtain, for a write request for log information of each service, a service identifier of the service and a traffic type of the service, where the traffic type is used to indicate a write traffic range of the log information of the service within a preset duration;

a determining module, configured to determine, based on the service identifier and the traffic type of the service, at least one target log server that processes the write request, and determine, based on the service identifier and the traffic type of the service, storage path information of the log information of the service on the log storage unit; and a processing module, configured to write, through the at least one target log server, the log information of the service into the log storage unit based on the storage path information.

According to one or more embodiments of the present disclosure, the plurality of log servers correspond to a plurality of log server identifiers sorted by size; and correspondingly, when determining, based on the service identifier and the traffic type of the service, at least one target log server that processes the write request, the determining module is specifically configured to: perform hash modulo processing on the service identifier based on a quantity of the plurality of log server identifiers, to determine an obtained remainder as a first hash parameter corresponding to the service identifier, and select a first target server identifier corresponding to the first hash parameter from the plurality of log server identifiers; determine, based on the traffic type of the service and the first target server identifier, sort position information of the at least one target log server that processes the write request; and select the at least one target log server that processes the write request from the plurality of log servers based on the sort position information.

According to one or more embodiments of the present disclosure, the log storage unit includes a plurality of storage directories, and each storage directory includes a plurality of storage partitions sorted by size; and correspondingly, that when determining, based on the service identifier and the traffic type of the service, the storage path information of the log information of the service on the log storage unit, the determining module is specifically configured to: select a target storage directory corresponding to the traffic type of the service from the plurality of storage directories, and determine a quantity of the plurality of storage partitions that the target storage directory includes and are sorted by size; perform hash modulo processing on the service identifier based on the quantity of the plurality of storage partitions that the target storage directory includes and are sorted by size, to determine an obtained remainder as a second hash parameter corresponding to the service identifier, and select a target storage partition corresponding to the second hash parameter from the plurality of storage partitions that the target storage directory includes and are sorted by size; and determine the target storage partition within the target storage directory as the storage path information of the log information of the service on the log storage unit.

According to one or more embodiments of the present disclosure, the log storage system further includes a metadata server; and the apparatus further includes: a storage module; where the storage module is configured to: for each service, obtain a plurality of storage time periods corresponding to log information of the service and storage path information corresponding to each storage time period; and establish a correspondence between a service identifier, the storage path information, and the storage time periods, and store the correspondence between the service identifier, the storage path information, and the storage time periods in the According to one or more embodiments of the present disclosure, the apparatus further includes: a query module; where the query module is configured to: in response to receiving a query request for log information of a target service, obtain a target service identifier of the target service and a query time period; determine, based on the target service identifier and the query time period, target storage path information corresponding to the target service identifier and the query time period from a correspondence between service identifiers, storage path information, and storage time periods that is stored in the metadata server; and determine, based on the target service identifier and the query time period, a target log server that processes the query request; and query, through the target log server, log information of the target service within the query time period from the log storage unit based on the target storage path information.

According to one or more embodiments of the present disclosure, the plurality of log servers correspond to a plurality of log server identifiers; and when determining, based on the target service identifier and the query time period, the target log server that processes the query request, the query module is specifically configured to: determine, from the correspondence between the service identifier, the storage path information, and the storage time periods of each service, a plurality of storage time periods that correspond to the target service identifier and are sorted by sequence; determine a sequence number of the query time period in the plurality of storage time periods sorted by sequence; perform hash modulo processing on the sequence number corresponding to the query time period based on a quantity of the plurality of log server identifiers, to determine an obtained remainder as a third hash parameter corresponding to the sequence number, and select a second target server identifier corresponding to the third hash parameter from the plurality of log server identifiers; and determine a log server corresponding to the second target server identifier as the target log server that processes the query request.

According to one or more embodiments of the present disclosure, a plurality of services are used to process one service request; and correspondingly, when in response to receiving the query request for the log information of the target service, obtaining the target service identifier of the target service and the query time period, the query module is specifically configured to: in response to receiving a query request for a target business identifier, obtain at least one target service corresponding to the target business identifier; and for each target service, determine that a query request for log information of the target service is received, and obtain a target service identifier of the target service and a query time period.

According to one or more embodiments of the present disclosure, the log information of the target service within the query time period includes at least one log packet and a packet identifier corresponding to each log packet; and correspondingly, the apparatus further includes: a display module, where the display module is configured to: display, on an information display interface, a first log packet in the log information and a first packet identifier corresponding to the first log packet; in response to receiving a first switching operation for the first packet identifier, display, on the information display interface, a second log packet in the log information and a second packet identifier corresponding to the second log packet, where the second packet identifier is a next packet identifier of the first packet identifier; and in response to receiving a second switching operation for the first packet identifier, display, on the information display interface, a third log packet in the log information and a third packet identifier corresponding to the third log packet, where the third packet identifier is a previous packet identifier of the first packet identifier.

In a third aspect, according to one or more embodiments of the present disclosure, there is provided an electronic device, including: a processor, and a memory communicatively connected to the processor;

where the memory stores computer-execution instructions; and the processor executes the computer-execution instructions stored in the memory, to implement the method for processing a log request according to the first aspect and any possible design of the first aspect.

In a fourth aspect, according to one or more embodiments of the present disclosure, there is provided a computer-readable storage medium, where the computer-readable storage medium stores computer-execution instructions, and when a processor executes the computer-execution instructions, the method for processing a log request according to the first aspect and any possible design of the first aspect is implemented.

In a fifth aspect, an embodiment of the present disclosure provides a computer program product, including a computer program, and when the computer program is executed by a processor, the method for processing a log request according to the first aspect and any possible design of the first aspect is implemented.

The foregoing descriptions are merely preferred embodiments of the present disclosure and an illustration of the applied technical principles. A person skilled in the art should understand that the scope of disclosure involved in the present disclosure is not limited to the technical solutions formed by specific combinations of the above technical features, and shall also cover other technical solutions formed by any combination of the above technical features or equivalent features thereof without departing from the above concept of disclosure, for example, technical solutions formed by replacing the above features and technical features having similar functions as disclosed in the present disclosure (but not limited thereto) with each other.

In addition, although the various operations are depicted in a specific order, it should not be understood as requiring these operations to be performed in the specific order shown or in a sequential order. Under certain circumstances, multitasking and parallel processing may be advantageous. Similarly, although several specific implementation details are included in the foregoing discussions, these details should not be construed as limiting the scope of the present disclosure. Some features that are described in the context of separate embodiments can also be implemented in combination in a single embodiment. In contrast, various features described in the context of a single embodiment may also be implemented in a plurality of embodiments individually or in any suitable sub-combination.

Although the subject matter has been described in a language specific to structural features and/or logical actions of methods, it should be understood that the subject matter defined in the appended claims is not necessarily limited to the specific features or actions described above. On the contrary, the specific features and actions described above are merely exemplary forms of implementing the claims.

What is claimed is:

1. A method for processing a log request, applied to a log storage system for processing large-scale log information in cloud services, with an architecture with computing and storage separated, wherein the log storage system comprises a request processing unit and a log storage unit, wherein the request processing unit comprises a plurality of log servers for processing log requests; and the method comprises:

receiving, from a cloud service system, a write request for log information of each service;

obtaining, from the write request, a service identifier of the service;

determining, based on the service identifier, a traffic type of the service, wherein the traffic type is used to indicate a write traffic range of the log information of the service within a preset duration;

determining, based on the service identifier and the traffic type of the service, at least one target log server that processes the write request, and determining, based on the service identifier and the traffic type of the service, storage path information of the log information of the service on the log storage unit; and writing, through the at least one target log server, the log information of the service into the log storage unit based on the storage path information, wherein the log storage system further comprises a metadata server; and the method further comprises:

for each service, obtaining a plurality of storage time periods corresponding to log information of the service and storage path information corresponding to each storage time period; and establishing a correspondence between a service identifier, the storage path information, and the storage time periods, and storing the correspondence between the service identifier, the storage path information, and the storage time periods in the metadata server, to query log information of a target service within a query time period from the log storage unit using a correspondence between service identifiers, storage path information, and storage time periods that is stored in the metadata server.

2. The method according to claim 1, wherein the plurality of log servers correspond to a plurality of log server identifiers sorted by size; and correspondingly, the determining, based on the service identifier and the traffic type of the service, the at least one target log server that processes the write request comprises:

performing hash modulo processing on the service identifier based on a quantity of the plurality of log server identifiers, to determine an obtained remainder as a first hash parameter corresponding to the service identifier, and selecting a first target server identifier corresponding to the first hash parameter from the plurality of log server identifiers;

determining, based on the traffic type of the service and the first target server identifier, sort position information of the at least one target log server that processes the write request; and selecting the at least one target log server that processes the write request from the plurality of log servers based on the sort position information.

3. The method according to claim 1, wherein the log storage unit comprises a plurality of storage directories, and each storage directory comprises a plurality of storage partitions sorted by size; and correspondingly, the determining, based on the service identifier and the traffic type of the service, the storage path information of the log information of the service on the log storage unit comprises:

selecting a target storage directory corresponding to the traffic type of the service from the plurality of storage directories, and determining a quantity of a plurality of storage partitions that the target storage directory comprises and are sorted by size;

performing hash modulo processing on the service identifier based on the quantity of the plurality of storage partitions that the target storage directory comprises and are sorted by size, to determine an obtained remainder as a second hash parameter corresponding to the service identifier, and selecting a target storage partition corresponding to the second hash parameter from the plurality of storage partitions that the target storage directory comprises and are sorted by size; and determining the target storage partition within the target storage directory as the storage path information of the log information of the service on the log storage unit.

4. The method according to claim 1, wherein querying the log information of the target service within the query time period from the log storage unit using the correspondence between service identifiers, storage path information, and storage time period comprises:

in response to receiving a query request for the log information of the target service, obtaining a target service identifier of the target service and the query time period;

determining, based on the target service identifier and the query time period, target storage path information corresponding to the target service identifier and the query time period from the correspondence between service identifiers, storage path information, and storage time periods that is stored in the metadata server; and determining, based on the target service identifier and the query time period, a target log server that processes the query request; and querying, through the target log server, the log information of the target service within the query time period from the log storage unit based on the target storage path information.

5. The method according to claim 4, wherein the plurality of log servers correspond to a plurality of log server identifiers; and the determining, based on the target service identifier and the query time period, the target log server that processes the query request comprises:

determining, from the correspondence between the service identifier, the storage path information, and the storage time periods of each service, a plurality of storage time periods that correspond to the target service identifier and are sorted by sequence;

determining a sequence number of the query time period in the plurality of storage time periods sorted by sequence;

performing hash modulo processing on the sequence number corresponding to the query time period based on a quantity of the plurality of log server identifiers, to determine an obtained remainder as a third hash parameter corresponding to the sequence number, and selecting a second target server identifier corresponding to the third hash parameter from the plurality of log server identifiers; and determining a log server corresponding to the second target server identifier as the target log server that processes the query request.

6. The method according to claim 4, wherein a plurality of services are used to process one business request; and correspondingly, in response to receiving the query request for the log information of the target service, obtaining the target service identifier of the target service and the query time period comprises:

in response to receiving a query request for a target business identifier, obtaining at least one target service corresponding to the target business identifier; and for each target service, determining that a query request for log information of the target service is received, and obtaining a target service identifier of the target service and a query time period.

7. The method according to claim 4, wherein the log information of the target service within the query time period comprises at least one log packet and a packet identifier corresponding to each log packet; and correspondingly, after querying, through the target log server, the log information of the target service within the query time period from the log storage unit based on the target storage path information, the method further comprises:

displaying, on an information display interface, a first log packet in the log information and a first packet identifier corresponding to the first log packet;

in response to receiving a first switching operation for the first packet identifier, displaying, on the information display interface, a second log packet in the log information and a second packet identifier corresponding to the second log packet, wherein the second packet identifier is a next packet identifier of the first packet identifier; and in response to receiving a second switching operation for the first packet identifier, displaying, on the information display interface, a third log packet in the log information and a third packet identifier corresponding to the third log packet, wherein the third packet identifier is a previous packet identifier of the first packet identifier.

8. An electronic device, applied to a log storage system for processing large-scale log information in cloud services, with an architecture with computing and storage separated, wherein the log storage system comprises a request processing unit and a log storage unit; wherein the request processing unit comprises a plurality of log servers for processing log requests; and wherein the electronic device comprises: a processor, and a memory communicatively connected to the processor;

wherein the memory stores computer-execution instructions; and when the processor executes the computer-execution instructions stored in the memory, the processor is configured to:

receive, from a cloud service system, a write request for log information of each service;

obtain, from the write request, a service identifier of the service;

determine, based on the service identifier, a traffic type of the service, wherein the traffic type is used to indicate a write traffic range of the log information of the service within a preset duration;

determine, based on the service identifier and the traffic type of the service, at least one target log server that processes the write request, and determine, based on the service identifier and the traffic type of the service, storage path information of the log information of the service on the log storage unit; and write, through the at least one target log server, the log information of the service into the log storage unit based on the storage path information, wherein the log storage system further comprises a metadata server; and the processor is further configured to:

for each service, obtain a plurality of storage time periods corresponding to log information of the service and storage path information corresponding to each storage time period; and establish a correspondence between a service identifier, the storage path information, and the storage time periods, and store the correspondence between the service identifier, the storage path information, and the storage time periods in the metadata server, to query log information of a target service within a query time period from the log storage unit using a correspondence between service identifiers, storage path information, and storage time periods that is stored in the metadata server.

9. The electronic device according to claim 8, wherein the plurality of log servers correspond to a plurality of log server identifiers sorted by size; and the processor is configured to:

perform hash modulo processing on the service identifier based on a quantity of the plurality of log server identifiers, to determine an obtained remainder as a first hash parameter corresponding to the service identifier, and select a first target server identifier corresponding to the first hash parameter from the plurality of log server identifiers;

determine, based on the traffic type of the service and the first target server identifier, sort position information of the at least one target log server that processes the write request; and select the at least one target log server that processes the write request from the plurality of log servers based on the sort position information.

10. The electronic device according to claim 8, wherein the log storage unit comprises a plurality of storage directories, and each storage directory comprises a plurality of storage partitions sorted by size; and the processor is further configured to:

select a target storage directory corresponding to the traffic type of the service from the plurality of storage directories, and determine a quantity of a plurality of storage partitions that the target storage directory comprises and are sorted by size;

perform hash modulo processing on the service identifier based on the quantity of the plurality of storage partitions that the target storage directory comprises and are sorted by size, to determine an obtained remainder as a second hash parameter corresponding to the service identifier, and select a target storage partition corresponding to the second hash parameter from the plurality of storage partitions that the target storage directory comprises and are sorted by size; and determine the target storage partition within the target storage directory as the storage path information of the log information of the service on the log storage unit.

11. The electronic device according to claim 8, wherein processor is further configured to:

in response to receiving a query request for the log information of the target service, obtain a target service identifier of the target service and the query time period;

determine, based on the target service identifier and the query time period, target storage path information corresponding to the target service identifier and the query time period from the correspondence between service identifiers, storage path information, and storage time periods that is stored in the metadata server; and determine, based on the target service identifier and the query time period, a target log server that processes the query request; and query, through the target log server, the log information of the target service within the query time period from the log storage unit based on the target storage path information.

12. The electronic device according to claim 11, wherein the plurality of log servers correspond to a plurality of log server identifiers; and the processor is further configured to:

determine, from the correspondence between the service identifier, the storage path information, and the storage time periods of each service, a plurality of storage time periods that correspond to the target service identifier and are sorted by sequence;

determine a sequence number of the query time period in the plurality of storage time periods sorted by sequence;

perform hash modulo processing on the sequence number corresponding to the query time period based on a quantity of the plurality of log server identifiers, to determine an obtained remainder as a third hash parameter corresponding to the sequence number, and select a second target server identifier corresponding to the third hash parameter from the plurality of log server identifiers; and determine a log server corresponding to the second target server identifier as the target log server that processes the query request.

13. The electronic device according to claim 11, wherein a plurality of services are used to process one business request, and the processor is further configured to:

in response to receiving a query request for a target business identifier, obtain at least one target service corresponding to the target business identifier; and for each target service, determine that a query request for log information of the target service is received, and obtain a target service identifier of the target service and a query time period.

14. The electronic device according to claim 11, wherein the log information of the target service within the query time period comprises at least one log packet and a packet identifier corresponding to each log packet; and the processor is further configured to:

display, on an information display interface, a first log packet in the log information and a first packet identifier corresponding to the first log packet;

in response to receiving a first switching operation for the first packet identifier, display, on the information display interface, a second log packet in the log information and a second packet identifier corresponding to the second log packet, wherein the second packet identifier is a next packet identifier of the first packet identifier; and in response to receiving a second switching operation for the first packet identifier, display, on the information display interface, a third log packet in the log information and a third packet identifier corresponding to the third log packet, wherein the third packet identifier is a previous packet identifier of the first packet identifier.

15. A non-transitory computer-readable storage medium, applied to a log storage system for processing large-scale log information in cloud services, with an architecture with computing and storage separated, wherein the log storage system comprises a request processing unit and a log storage unit, wherein the request processing unit comprises a plurality of log servers for processing log requests, wherein the computer-readable storage medium stores computer-execution instructions, and when the computer-execution instructions are executed by a processor, the following operations are implemented:

receiving, from a cloud service system, a write request for log information of each service;

obtaining, from the write request, a service identifier of the service;

determining, based on the service identifier, a traffic type of the service, wherein the traffic type is used to indicate a write traffic range of the log information of the service within a preset duration;

determining, based on the service identifier and the traffic type of the service, at least one target log server that processes the write request, and determining, based on the service identifier and the traffic type of the service, storage path information of the log information of the service on the log storage unit; and writing, through the at least one target log server, the log information of the service into the log storage unit based on the storage path information, wherein the log storage system further comprises a metadata server; and when the computer-execution instructions are executed by the processor, the following operations are implemented;

for each service, obtaining a plurality of storage time periods corresponding to log information of the service and storage path information corresponding to each storage time period; and establishing a correspondence between a service identifier, the storage path information, and the storage time periods, and storing the correspondence between the service identifier, the storage path information, and the storage time periods in the metadata server, to query log information of a target service within a query time period from the log storage unit using a correspondence between service identifiers, storage path information, and storage time periods that is stored in the metadata server.

16. The storage medium according to claim 15, wherein the plurality of log servers correspond to a plurality of log server identifiers sorted by size; and when the computer-execution instructions are executed by the processor, the following operations are implemented:

performing hash modulo processing on the service identifier based on a quantity of the plurality of log server identifiers, to determine an obtained remainder as a first hash parameter corresponding to the service identifier, and selecting a first target server identifier corresponding to the first hash parameter from the plurality of log server identifiers;

determining, based on the traffic type of the service and the first target server identifier, sort position information of the at least one target log server that processes the write request; and selecting the at least one target log server that processes the write request from the plurality of log servers based on the sort position information.

17. The storage medium according to claim 15, wherein the log storage unit comprises a plurality of storage directories, and each storage directory comprises a plurality of storage partitions sorted by size; and when the computer-execution instructions are executed by the processor, the following operations are implemented:

selecting a target storage directory corresponding to the traffic type of the service from the plurality of storage directories, and determining a quantity of a plurality of storage partitions that the target storage directory comprises and are sorted by size;

performing hash modulo processing on the service identifier based on the quantity of the plurality of storage partitions that the target storage directory comprises and are sorted by size, to determine an obtained remainder as a second hash parameter corresponding to the service identifier, and selecting a target storage partition corresponding to the second hash parameter from the plurality of storage partitions that the target storage directory comprises and are sorted by size; and determining the target storage partition within the target storage directory as the storage path information of the log information of the service on the log storage unit.

18. The storage medium according to claim 15, wherein when the computer-execution instructions are executed by the processor, the following operations are implemented:

in response to receiving a query request for the log information of the target service, obtaining a target service identifier of the target service and the query time period;

determining, based on the target service identifier and the query time period, target storage path information corresponding to the target service identifier and the query time period from the correspondence between service identifiers, storage path information, and storage time periods that is stored in the metadata server; and determining, based on the target service identifier and the query time period, a target log server that processes the query request; and querying, through the target log server, the log information of the target service within the query time period from the log storage unit based on the target storage path information.

19. The storage medium according to claim 18, wherein the plurality of log servers correspond to a plurality of log server identifiers, and when the computer-execution instructions are executed by the processor, the following operations are implemented:

determining, from the correspondence between the service identifier, the storage path information, and the storage time periods of each service, a plurality of storage time periods that correspond to the target service identifier and are sorted by sequence;

determining a sequence number of the query time period in the plurality of storage time periods sorted by sequence;

performing hash modulo processing on the sequence number corresponding to the query time period based on a quantity of the plurality of log server identifiers, to determine an obtained remainder as a third hash parameter corresponding to the sequence number, and selecting a second target server identifier corresponding to the third hash parameter from the plurality of log server identifiers; and determining a log server corresponding to the second target server identifier as the target log server that processes the query request.

20. The storage medium according to claim 18, wherein a plurality of services are used to process one business request, and when the computer-execution instructions are executed by the processor, the following operations are implemented:

in response to receiving a query request for a target business identifier, obtaining at least one target service corresponding to the target business identifier; and for each target service, determining that a query request for log information of the target service is received, and obtaining a target service identifier of the target service and a query time period.

* * * * *